(12) United States Patent
Basso et al.

(10) Patent No.: US 7,522,621 B2
(45) Date of Patent: Apr. 21, 2009

(54) APPARATUS AND METHOD FOR EFFICIENTLY MODIFYING NETWORK DATA FRAMES

(75) Inventors: Claude Basso, Raleigh, NC (US); Jean L. Calvignac, Raleigh, NC (US); Chih-jen Chang, Apex, NC (US); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 11/030,344

(22) Filed: Jan. 6, 2005

(65) Prior Publication Data

US 2006/0146881 A1 Jul. 6, 2006

(51) Int. Cl.
*H04L 12/56* (2006.01)

(52) U.S. Cl. ............... 370/412; 370/429; 370/474; 370/476

(58) Field of Classification Search ......... 370/474, 370/476, 412, 235, 428, 429
See application file for complete search history.

(56) References Cited

U.S. PATENT DOCUMENTS

| 5,191,582 | A | | 3/1993 | Upp |
| 5,243,596 | A | | 9/1993 | Port et al. |
| 5,633,865 | A | * | 5/1997 | Short .................. 370/412 |
| 6,034,963 | A | | 3/2000 | Minami et al. |
| 6,341,367 | B1 | | 1/2002 | Downing |
| 6,393,028 | B1 | | 5/2002 | Leung |
| 6,735,210 | B1 | * | 5/2004 | Lindeborg et al. ......... 370/412 |
| 2001/0049744 | A1 | | 12/2001 | Hussey et al. |
| 2002/0118694 | A1 | * | 8/2002 | Calvignac et al. ........ 370/428 |
| 2002/0156908 | A1 | * | 10/2002 | Basso et al. ............. 709/231 |
| 2003/0012209 | A1 | | 1/2003 | Abdelilah et al. |
| 2004/0037276 | A1 | * | 2/2004 | Henderson et al. ......... 370/371 |
| 2004/0218592 | A1 | * | 11/2004 | Nagar et al. ............. 370/381 |

\* cited by examiner

*Primary Examiner*—Ricky Ngo
*Assistant Examiner*—Wei-Po Kao
(74) *Attorney, Agent, or Firm*—Connolly Bove Lodge & Hutz LLP; Josh Cockburn (57) ABSTRACT

Apparatus and method for storing network frame data which is to be modified. A plurality of buffers stores the network data which is arranged in a data structure identified by a frame control block and buffer control block. A plurality of buffer control blocks associated with each buffer storing the frame data establishes a sequence of the buffers. Each buffer control block has data for identifying a subsequent buffer within the sequence. The first buffer is identified by a field of a frame control block as well as the beginning and ending address of the frame data. The frame data can be modified without rewriting the data to memory by altering the buffer control block and/or frame control block contents without having to copy or rewrite the data in order to modify it.

5 Claims, 8 Drawing Sheets

Buffer Control Block

| Word | Bit | | | | |
|---|---|---|---|---|---|
| | 35 34 33 32 31 30 29 28 27 26 25 24 23 22 21 20 19 18 17 16 15 | 14 13 12 11 10 09 08 07 06 05 | 04 03 | 02 | 01 | 00 |
| 1 | NBA | SBP | TB LB | | | P |
| 2 | SBA | EBP | BUC | | | P |

APPARATUS AND METHOD FOR EFFICIENTLY MODIFYING NETWORK DATA FRAMES

BACKGROUND OF THE INVENTION

The present invention relates to the processing of network data frames. Specifically, a data structure for a data frame is disclosed along with an apparatus and method for modifying the data structure.

Computing networks transfer data to different devices over a network in frames. The frames have a header containing address information such as a destination address, source address and a data count. Appended to the header is a payload, which may typically be between 64-1,500 bytes of information for the destination address. A trailer is appended to the payload data and header data which includes error checking and error correcting bytes for correcting data containing a minor number of errors at the destination address.

These data frames encounter numerous devices during passage over the network. Specifically, routers, bridges and other devices may pass the data frame to another portion of the network, and in the process, modify the data. Specifically, it is known in router applications that occasionally a received data frame will require alteration of the data packets contained within the data frame. These alterations may be in the form of insertion of another data packet, deletion of a data packet or the joining or splitting of packet data before retransmission on the network.

The conventional process for modifying packet data requires copying or moving original data packets in a frame of data to a new memory location. Once moved, operations can be performed on the data to append or delete information from the data packet, and the revised data frame can then be transmitted over the network.

The conventional schemes for modifying data requires a higher packet memory access bandwidth, so that packet information can be read, modified and re-stored quickly. Some frame alteration operations require a read/modified write of the data packet to the packet memory which is usually implemented in a DRAM, increasing latency associated with packet processing as well as requiring a higher packet memory access bandwidth.

Routers which process the incoming network data frame may determine that the address information in the header is incomplete. Additional data is found in a routing table, which is necessary for the network data frame to be passed to an intermediary device such as another router, or a bridge, may need to be appended in the address portion of the header. Other operations which may have to be performed on the received network frame include splitting network data frames into two or more frames, or joining packets of one frame to another. These operations as well require moving and copying of the original data, burdening the memory bandwidth, increasing latency and reducing system performance.

BRIEF SUMMARY OF THE INVENTION

An apparatus and method are provided to modify frame data received over a network. The network data is stored in a plurality of data buffers and a data structure is formed joining the data buffers. A control memory defines the data structure using a plurality of buffer control blocks which are associated with each of the data storage buffers. The control blocks establish a linked sequence of the buffers, and have data identifying the next buffer in the sequence. A frame control block identifies the address of the buffer control block of the first buffer in the sequence as well as a staring address for the first packet of data in the first buffer. The buffer control blocks similarly identify the next buffer in the sequence and a starting address for the data stored in the identified buffer.

In accordance with the invention, the data is modified by making suitable modifications to the control blocks without burdening the memory bandwidth which results from copying the data. By modifying particular control blocks, it is possible to link data to the data frame stored in the buffers, as well delete data stored in the buffers from the frame without ever having to copy, move or modify the stored data itself.

In accordance with a preferred embodiment of the invention, the frame control block includes data which identifies both the starting position in the first buffer containing the frame data, as well as the ending position of the data in the first buffer. The buffer control blocks identify the beginning location in a subsequent buffer containing the data, as well as the ending position within the subsequent buffer of the buffer sequence containing data. Accordingly, data can be inserted or deleted from the data frame by modifying the buffer control blocks starting and ending position data.

DETAILED DESCRIPTION OF THE PREFERRED EMBODIMENT

Figure 1:
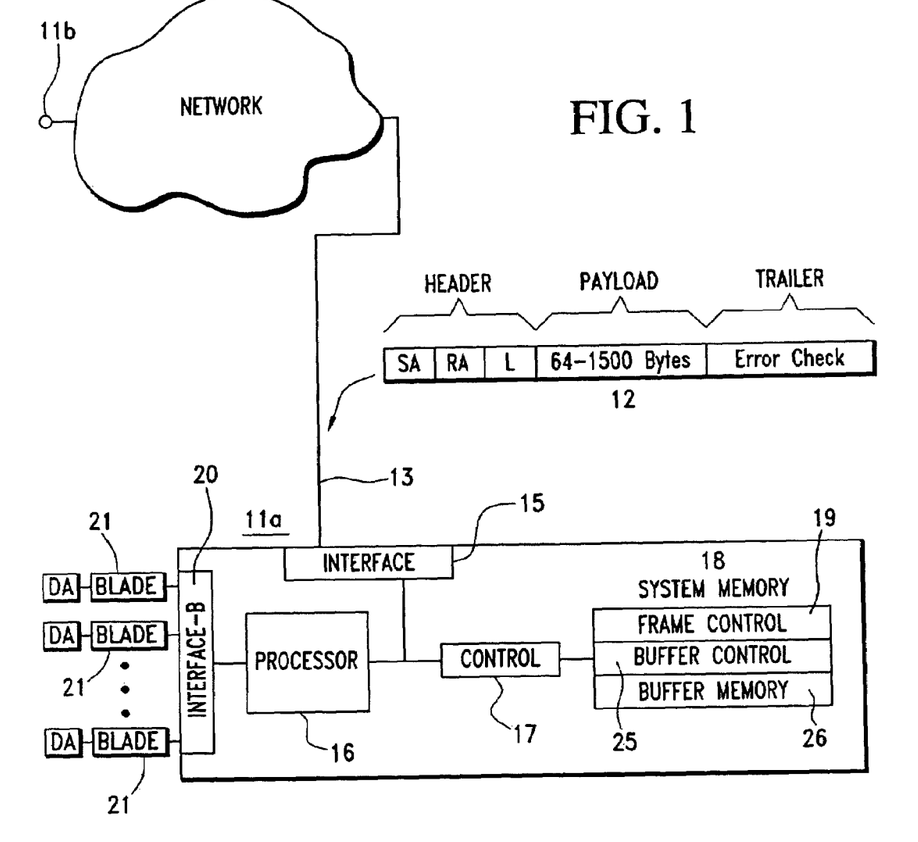
FIG. 1 shows a network system for forwarding network frame data.

Referring now to FIG. 1, a network 11 is shown having two nodes 11A and 11B. In practice, the network would have many nodes, all of which are interconnected over a bus 13. The frame of data transferred between nodes over bus 13 has the general form shown as 12. A header portion of the frame includes a source address (SA), recipient address (RA) and a indication of the number of bytes (L) contained in the remaining portion of the frame data. The payload portion of the frame data is typically between 64-1,500 bytes of information for the recipient. A trailer includes error check data so that detected errors in the frame can be corrected if they are not excessive.

Node 11A receives a data frame on an interface 15. The node 11A may include a network router, or a network bridge which transfers the received data frame 12 through network interface-B 20 to a plurality of blades 21, connected to a plurality of destination addresses DA. The frame data 12 may need to be modified before it is passed on to one of the blades 21. For instance, the header information may incompletely define a routing path for the header when it is received by the node 11A.

The node 11A, in the case of a router, includes a processor 16 for controlling the receipt and dispatch of data frames 12. The processor 16 receives via the interface 15 the data frame, and stores the data frame in buffer memory which is part of the node system memory 18. The system memory 18 is controlled by memory controller 17, which moves data in/out of the buffer memory through network interface-B 20 for dispatch over one of blades 21 to the next node.

The present invention provides a unique way of modifying an incoming data frame 12. The modification includes adding data packets to the received data, deleting data packets from the data frame 12, combining data packets of different frames or splitting a data frame into multiple data frames. The process for making modifications to the incoming frame data is controlled by a node processor 16.

Node processor 16 stores the incoming data in a buffer memory 26 which is part of the main memory 18. Main memory 18 may be a DRAM for storing the frame data and a SRAM for storing a frame control block portion 19 and buffer control block portion 25. As will be evident with respect to the remaining figures, the frame data 12 stored within the buffer memory 26 may be manipulated without rewriting the contents of the frame data buffer memory by making changes to the data structure represented by the contents of the frame control and buffer control portions of memory 25.

Figure 2:
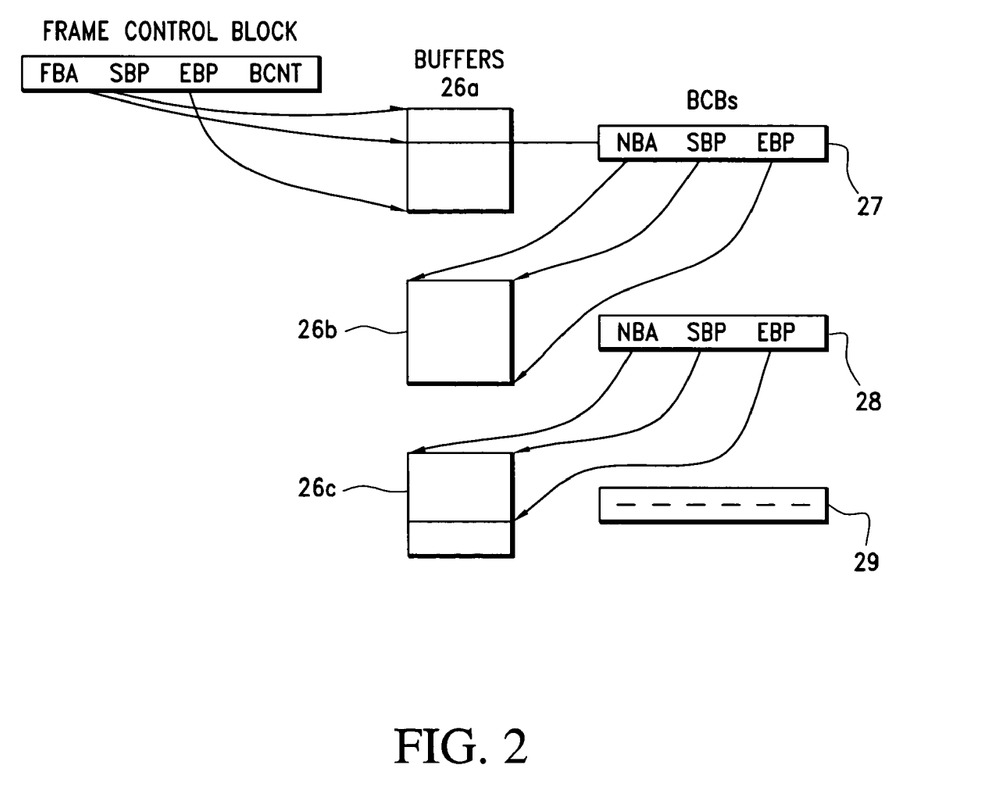
FIG. 2 illustrates the data structure of a received frame data packet in accordance with a preferred embodiment.

FIG. 2 shows the organization of the frame control block 19, buffer control blocks and the buffer memory 26 containing the received frame data. The buffer memory is portioned into individual buffers. A frame control block FCB stored in the frame control block memory 19 identifies a linked set of buffers 26a, 26b and 26c which store the incoming frame data. The frame control block FBA includes the first buffer address FBA of the buffer containing a first set of packets belonging to the frame data 12. The starting byte position within the first buffer 26a is indicated by the data SBP, and the ending byte of the data in the first buffer memory 26a is identified as EBP. A next frame address, for the following frame received from the network bus 13 is identified as NFA. A total byte count for the frame, BCNT is also included in the frame control block.

Figure 3:
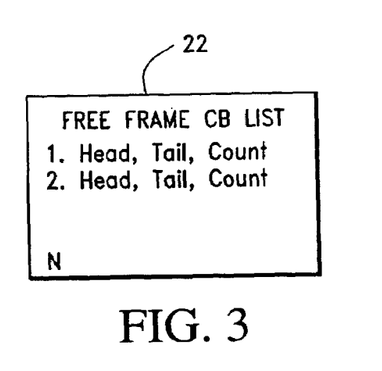
FIG. 3 shows the Free Frame Control Block list maintained by the processor of FIG. 1.
Figure 4:
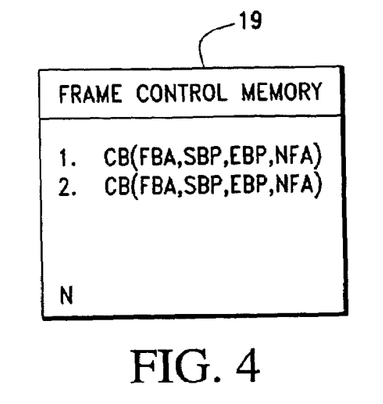
FIG. 4 shows the frame control memory contents for frame control blocks.

The Frame Control Block is created when the frame is received by consulting a free frame control block list 22 as shown in FIG. 3. The list includes the number of control blocks which have not been used, or which have been recycled, due to the transmission of a data frame 12 out of the node 11A. The first Frame Control Block in the Free Frame Control Block list includes an identification of the head, tail and count of the first available control block within frame control memory 19.

Figure 5:
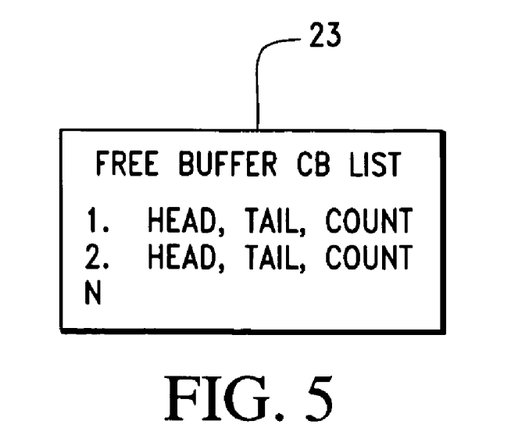
FIG. 5 illustrates the Free Buffer Control Block list used to select new control blocks.

As in the case of creating frame control blocks, buffer control blocks are created by consulting the free buffer CB list of FIG. 5. When frames of data are transmitted from node 11A via blades 21, the list is updated to free-up buffers which are no longer needed. New data arriving at the node 11A can thus be stored in those buffers that are identified in the free buffer list.

Figure 6:
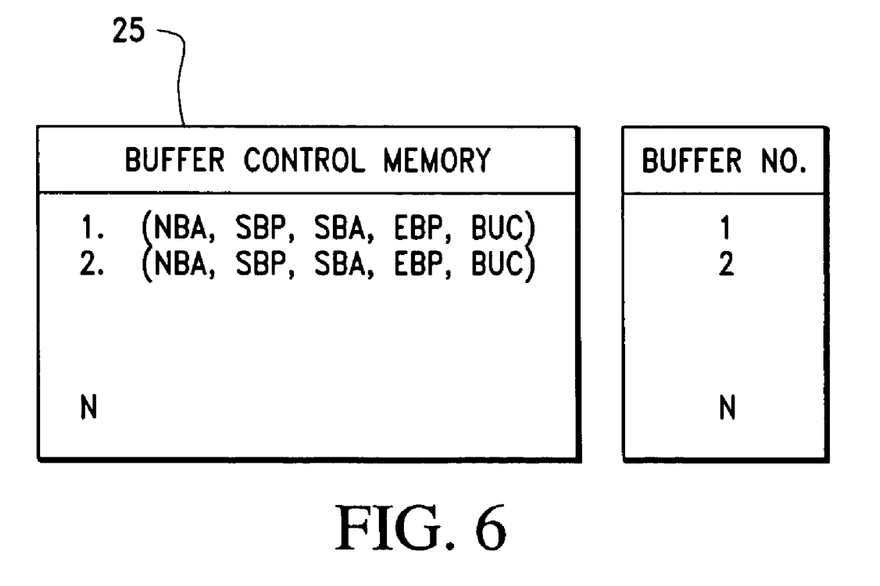
FIG. 6 illustrates the buffer control blocks and buffer storage arrangement for the node system memory.

The remaining buffers containing data belonging to the incoming frame data 12 are identified by the buffer control blocks in the buffer control memory 25 portion of the node memory 18. Referring now to FIGS. 5 and 6, a similar free buffer list 23 is maintained, so that as frame data is received, a frame buffer control block may be identified which in turn identifies an available buffer to store the data. As shown in FIG. 6, for each address within the buffer control memory 25 there is a buffer storage location corresponding to the buffer control block. Each buffer location has a corresponding buffer control block.

The buffer control block includes the next buffer address NBA in the linked list of buffers which contains data belonging to the incoming data frame 12 as shown in FIG. 2. The first buffer control block 27 is pointed to by the frame control block data FBA. The buffer control block 27 for the first buffer 26a identifies the subsequent buffer control block 28 of a linked list of buffers which store the remaining portions of the incoming frame data 12. The data field NBA identifies the next buffer, control block. SBP identifies the starting byte position within the next buffer, SBA identifies the buffer location and EBP identifies the ending byte position within the next linked buffer. BUC identifies the number of instances that the buffer is shared with other data frames.

Figure 7:
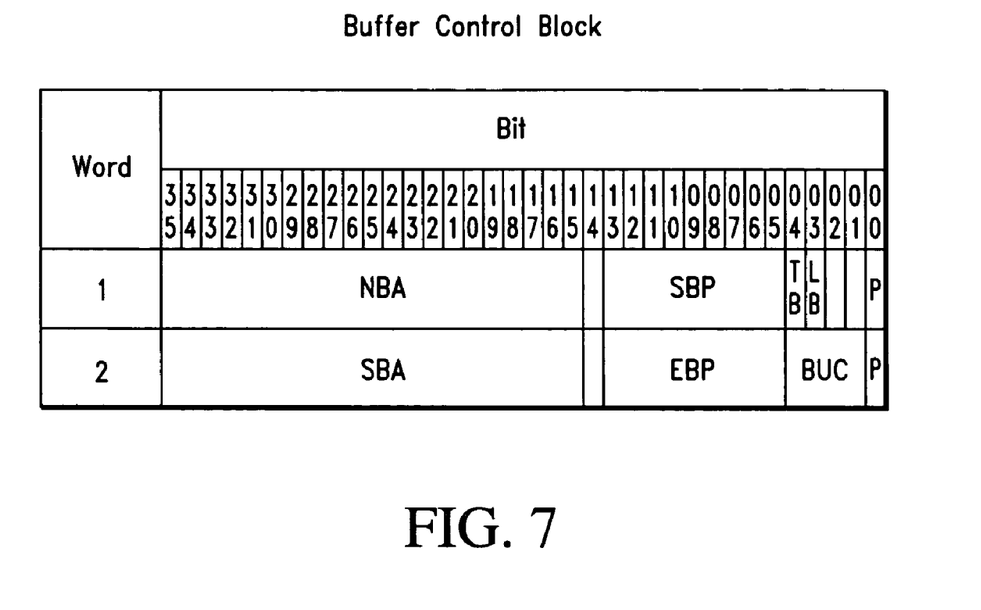
FIG. 7 is a detailed illustration of the buffer control block used in a preferred embodiment.

The specific buffer control block of a preferred embodiment is shown in FIG. 7. Each of the bit position of the buffer control block is shown comprising two words.

| Word | Bits | Bit Count | Field Name | Description |
|---|---|---|---|---|
| 1 | 35-15 | 21 | NBA | Next Buffer Address: The NBA field is used to store the address of the buffer control block associated with the next buffer in a frame. |
|  | 14 | 1 |  | Reserved |
|  | 13-5 | 9 | SBP | Starting Byte Position: The SBP field is used to store the offset of the first valid byte of data in the buffer pointed by the SBA field. Valid values are from 0 to 511. This is a qualifier. |
|  | 4 | 1 | TB | Transient Buffer: The TB is used only when transmitting multicast frames to specify whether the next buffer in the frame should be returned to the free buffer queue after its data is read from transmission. This is a qualifier. |
|  | 3 | 1 | LB | Last Buffer: This bit is used to indicate that this buffer is the last buffer of a frame. This bit is used by the frame manipulation finite state machine to prevent altering the data of other frame due to the error in the byte offset position. |
|  | 2-1 | 2 |  | Reserved. |
|  | 0 | 1 | P | Parity: This bit is used for error protection of the first entry of the BCB. |
| 2 | 35-15 | 21 | SBA | Shadow Buffer Address: This field is used to store the address of the buffer where the frame data can be located. |
|  | 14 | 1 |  | Reserved. |
|  | 13-5 | 9 | EBP | Ending Byte Position: The EBP field is used to store the offset of the last valid byte of data in the buffer pointed by the SBA field. Valid values are from 0 to 511. This is a qualifier. |
|  | 4-1 | 4 | BUC | Buffer: Usage Count: The Usage Count is used to store the number of instances that this buffer is shared among other frames. |
|  | 0 | 1 | P | Parity: This bit is used for error protection of the second entry of the BCB. |

The buffer storage locations storing the received frame data may have addresses corresponding to each address for a respective buffer control block. The contents of the buffer storage locations need not be written, read or copied if modifications to the frame data are made. Additional data may be added to the frame data, or original frame data may be deleted, and the frames can be combined without recopying the original data contents in the buffer memories.

Figure 8:
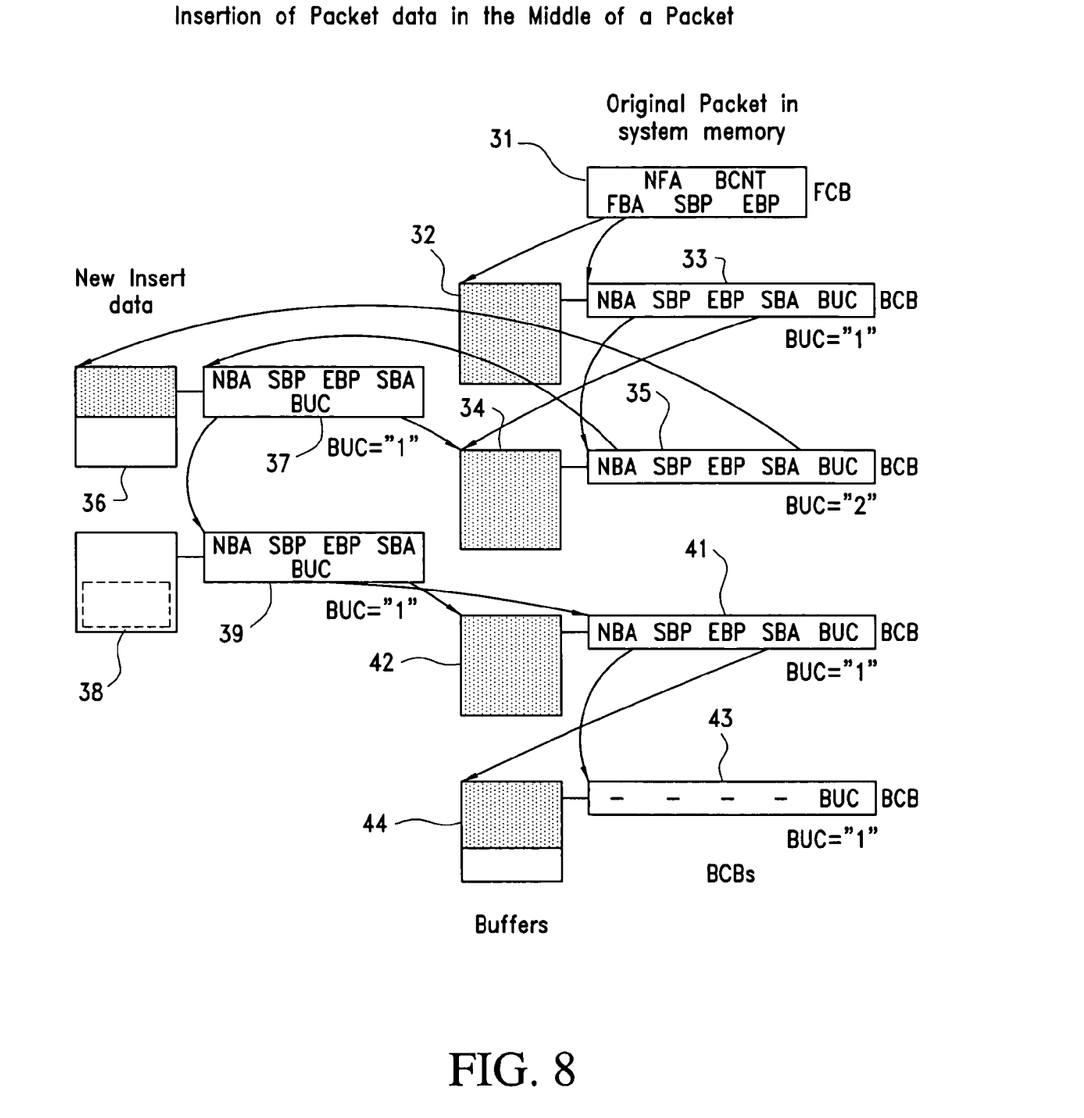
FIG. 8 illustrates the process of insertion of packet data into the middle of a received frame data packet.

FIG. 8 illustrates how the foregoing data structure identified by the frame control block and buffer control blocks can be used to insert data to existing frame data. The frame control block 31 is shown having data FBA which points to the first buffer 32 location containing incoming frame data, and the control block for that buffer 33. Control block 33 associated with buffer 32 indicates in field NBA that the next buffer in the linked sequence is 34, where SBP identifies the starting point for the original frame data and EBP the ending data point.

If new data is to be inserted in the original data stored in buffer 34, the fields SBP and EBP of control block 35 for the buffer memory 34 are modified, so that it points to the buffer location 36 containing new data to be inserted in the frame. A buffer control block 37 associated with the buffer 36 points to the control block 39 of a second, empty buffer 38. The newly inserted data to be placed in the middle of a frame data packet 12 has a starting location identified in buffer control block 35, data field SBA and ending by the position EBP. The remaining original data in buffer 34 which follows the newly added buffer 36 is identified by field SBP and EBP of buffer control block 37.

The address of a new buffer 38 is written in the field NBA of buffer control block 37. Thus, when the system reads the contents of the frame data identified by frame control block 31, it will first proceed to read the contents of buffer 32. The buffer control block 33 fields SBP and EBP will then direct data reading to that portion of buffer 34 containing the first portion of the original frame data. When the system has reached the end of the data EBP indicated by buffer control block 33, buffer control block 35 will shift control to read the new data of buffer 36. Once the contents of buffer 36 are read, buffer control block 37 returns control to read the remaining portion of the original frame data from buffer 34 at the starting address SBP through the ending address EBP.

The empty buffer 38 control block 39 is used to link the remaining buffers 42 and 44 of the original frame data to the newly inserted data. Field NBA of buffer control block 37 points to buffer control block 39. Buffer control block 39 field NBA points to the buffer 42, which was in the original frame data. The remaining control blocks 41 and 43 maintain the original linked relationship between the frame data in buffers 42 and 44.

Thus, using the foregoing it is possible to add data to the original frame data within the node memory 19 without copying any of the contents of the frame data.

Figure 9:
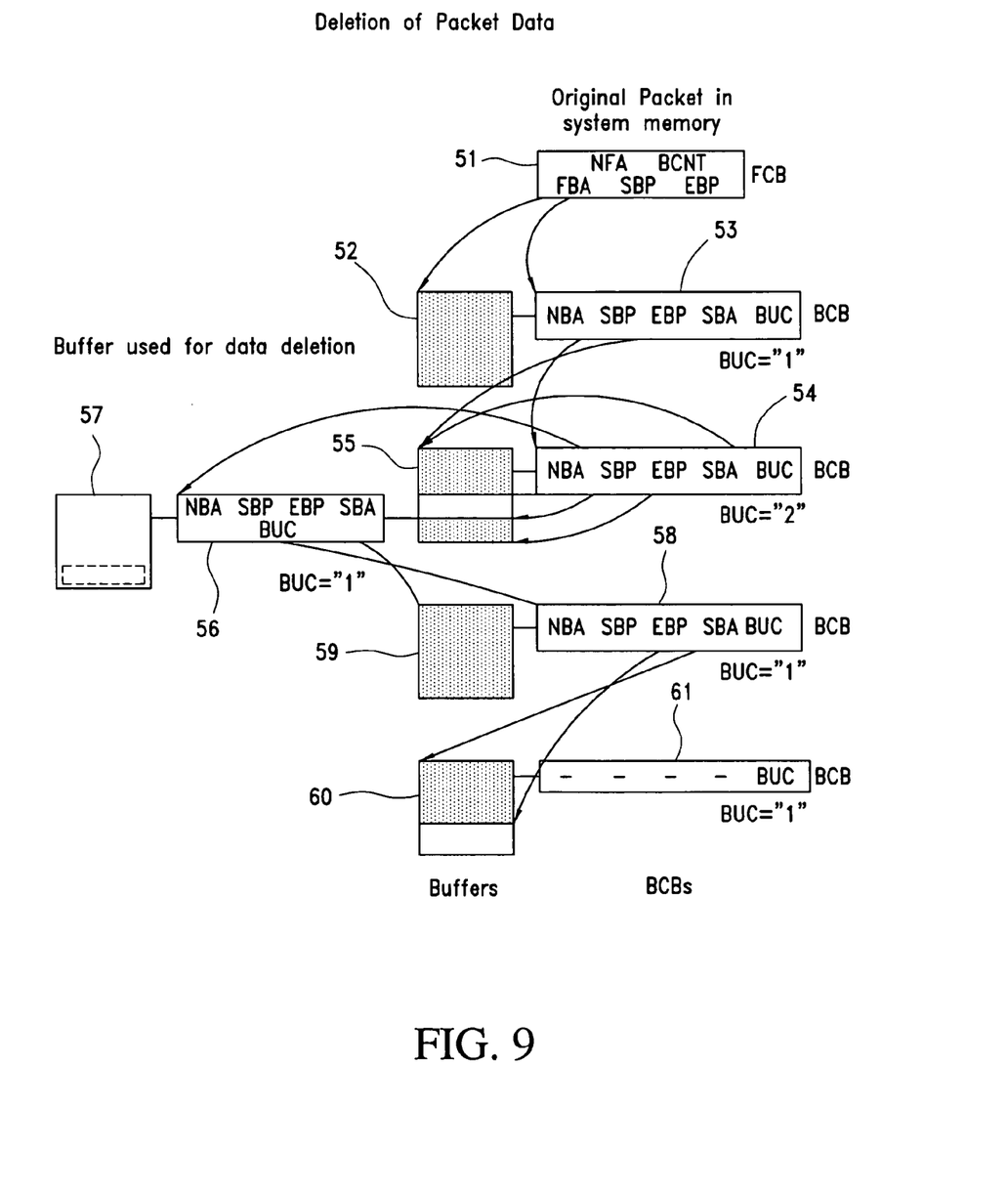
FIG. 9 illustrates the process of deleting a packet of data from the original received frame data.

The foregoing data structure lends itself to a deletion of a packet in the original frame data. Referring now to FIG. 9, the original frame data is stored in buffers 52, 55, 59 and 60. Each of the buffers have a respective buffer control block 53, 54, 58 and 61. The frame control block 51 NFA field points to the first buffer location 52, and the beginning and ending address (SBP and EBP) within buffer 52 containing the frame data. As before, the NBA field of each of the buffer control blocks 53, 54, 58 and 61 point to the next buffer control block of the linked list and provides the starting and ending data byte positions (SBP and EBP) for the buffer.

The deletion of a data stored in buffer 55 is shown in FIG. 9. As can be seen, a dummy buffer 57 is setup having a buffer control block 56. The buffer control block 53 has a new starting byte position SBP, and ending byte position EBP written to the buffer control block 53 which excludes the data to be deleted.

NBA field of buffer control block 54 in turn points to the control block 56 of the dummy buffer 57. The original data frame data stored in buffer 59 is pointed to by control block 56. Thus, the system when traversing the linked list of buffer control blocks, includes all the data in buffer 52, the data in buffer 55 identified by the new starting byte and ending byte positions (SBP and EBP) of control block 53, and all of the data contained in buffers 59 and 60 which are identified by control blocks 56 and 58. As can be seen in the foregoing scenario, no copying of data is required in order to delete data from the frame data. Control block 61 marks the end of the linked list of buffers.

Figure 10:
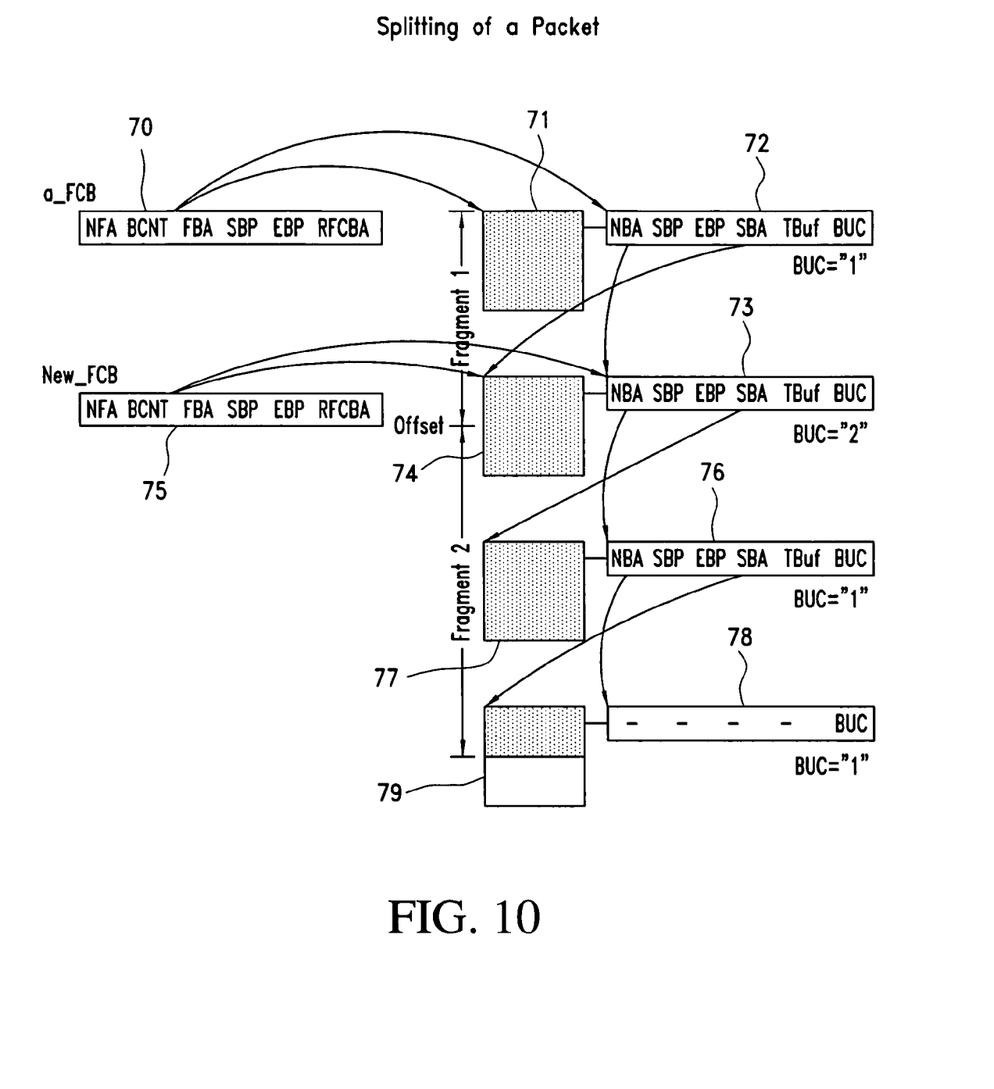
FIG. 10 shows how a packet of data can be split in a received data frame into two separate frames.

FIG. 10 shows how a frame data packet can be split into two frames of data. The original data of the originally received frame of data is stored in buffers 71, 74, 77 and 79. The original frame control block 70 field FBA identifies buffer 71 and buffer control block 72 as the first buffer in a linked list containing all the frame data. A second frame control block 75 is created, which will identify the beginning of a second frame, comprising data from the original data frame. Buffer control block 72 of the original first buffer memory 71 field SBP points to starting byte position and ending byte position for buffer 74, and field NBA points to the next buffer control block 73 and memory 74. By modifying the SBP and EBP data fields of control block 72, the end of frame 1 data is identified in the buffer 74.

The new frame of data is identified by the new frame control block 75. The first buffer control block 73 containing data for frame 2 is pointed to by FBA of the frame control block 75. Thus the beginning of the second frame is then identified, as within buffer 74 (which also includes the end of the first frame).

The remaining data of the second frame is pointed to by field NBA of control block 73, which in turn points to control block 76, which points to control block 78 associated with buffer 79.

Thus, it can be seen that a frame data packet can be split into multiple frames without moving or recopying any of the data originally stored in buffers 71, 74, 77 and 79 using the method in accordance with the present invention.

Figure 11:
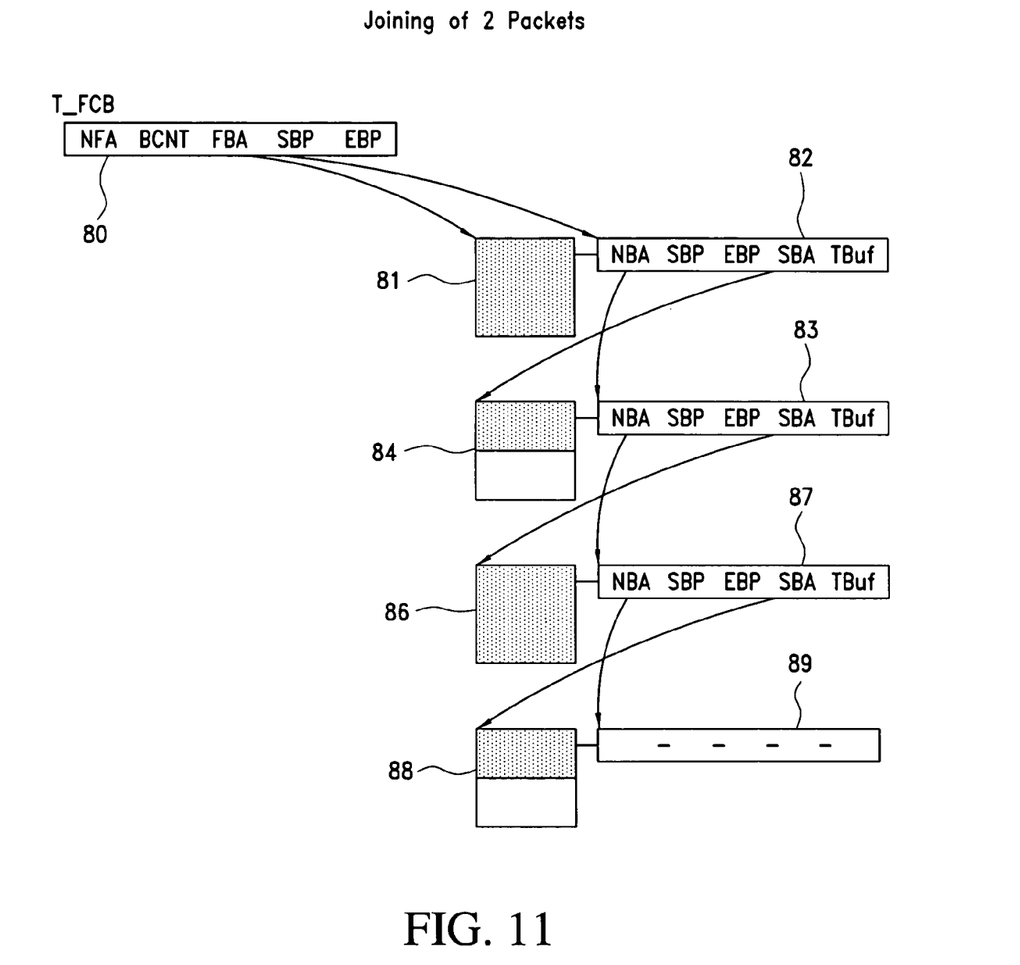
FIG. 11 shows how packet data from two separate frames may be combined into a single frame.

FIG. 11 illustrates a scenario where two packets of data can be joined together which are received in two separate frames. One of the frames is identified by a frame control block 80, and the other by frame control block 85. The original data of the first frame is stored in buffers 81 and 84. The respective buffer control blocks 82, 83 of each of these buffers originally identify the contents of these buffers as belonging to the first frame 80. The frame control block 85 and buffer control blocks 87 and 89 identify the data received in the second frame.

To join the two frames of data, the buffer control block 83 is modified, so that the next control block 87 is identified and the starting byte position and ending byte positions of the first buffer 86 containing the first portion of the second frame data is identified. Thus, the linked data buffers formerly identified by frame control block 85 are now within the link list of buffer control blocks 82 and 83 of frame control block 80. In this way, the data can be joined without rewriting or copying the data to the code memory 19.

The foregoing scenario of joining, deleting, and combining different frames of data are all possible in a system which does not require recopying the data to dynamic memory.

The foregoing description of the invention illustrates and describes the present invention. Additionally, the disclosure shows and describes only the preferred embodiments of the invention in the context of a data structure and method for efficiently modifying network data frames, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

What is claimed as new and desired to be protected by Letters Patent of the United States is:

1. A method for modifying a data frame comprising:
    storing said data frame in a plurality of buffers;
    creating a frame control block identifying the first buffer containing said data frame;
    creating a buffer control block for each of said buffers containing data, said buffer control block identifying the next buffer in a sequence of said buffers having frame data;
    changing the data in at least two of said buffer control blocks to identify a new sequence of buffers containing a frame of data;
    modifying the data of a first control block which points to a buffer in said sequence where data is to be deleted to point to a second buffer control block, and to indicate that data of said buffer ends at an point of deletion of deleted data; and
    creating a second buffer control block corresponding to an empty buffer which is pointed to by said first buffer control block and which points to a buffer which was previously pointed to by the first control block.

2. The method according to claim 1, wherein frame data is modified to delete data stored in one of said buffers.

3. The method according to claim 1, wherein frame data is modified to include additional data stored in an additional buffer, comprising the additional steps of:
    changing the data in one of said buffer control blocks to identify said additional buffer;
    creating a new control block to identify the buffer previously identified in said modified control block; and
    wherein a new sequence of buffers including said additional buffer is created.

4. The method according to claim 1, further comprising changing data in said frame control block to reflect a new byte count for said frame.

5. The method for modifying data according to claim 1, further comprising:
    modifying the data of a first control block which points to a buffer in said sequence where new data is to be added to point to said created buffer control block, and to indicate that data of said buffer data ends at an insertion point for said new data;
    creating a second buffer control block corresponding to a buffer that contains new data to be added to said data frame which identifies the insertion, point in a buffer containing the original frame data; and
    creating a third buffer control block corresponding to an empty buffer which is pointed to by said second buffer control block and which points to a buffer which was previously pointed to by the first control block.

* * * * *